(12) United States Patent
Hardy

(10) Patent No.: US 6,985,559 B2
(45) Date of Patent: Jan. 10, 2006

(54) METHOD AND APPARATUS FOR ESTIMATING QUALITY IN A TELEPHONIC VOICE CONNECTION

(75) Inventor: William C. Hardy, Dallas, TX (US)

(73) Assignee: MCI, Inc., Ashburn, VA (US)

(*) Notice: Subject to any disclaimer, the term of this patent is extended or adjusted under 35 U.S.C. 154(b) by 154 days.

(21) Appl. No.: 09/779,092

(22) Filed: Feb. 8, 2001

(65) Prior Publication Data

US 2002/0097840 A1 Jul. 25, 2002

Related U.S. Application Data

(63) Continuation-in-part of application No. 09/220,733, filed on Dec. 24, 1998, now Pat. No. 6,370,120.

(51) Int. Cl.
 *H04M 1/24* (2006.01)

(52) U.S. Cl. ..................................... 379/1.02; 707/236
(58) Field of Classification Search ............... 379/10.01, 379/22.02, 27.03, 29.01, 1.01, 1.02, 1.03, 379/1.04; 704/202, 232, 236, 237, 240, 244, 704/256, 221, 228, 233
See application file for complete search history.

(56) References Cited

U.S. PATENT DOCUMENTS

| | | |
|---|---|---|
| 4,015,480 A | 4/1977 | Giers |
| 4,438,511 A | 3/1984 | Baran |
| 5,119,367 A | 6/1992 | Kawakatsu et al. |

(Continued)

FOREIGN PATENT DOCUMENTS

| | | |
|---|---|---|
| EP | 1079573 | 2/2001 |

OTHER PUBLICATIONS

"Bark Scale Equalizer Design Using Warped Filter", Wang Peng, Wee Ser, Ming Zhang, 2001, IEEE, pp. 3317–3320.*
"Bark and ERB Bilinear Transforms", Julius O. Smith, III, et al, 1999, IEEE, pp. 697–708.*

ITU–T, Method for Subjective Determination of Transmission Quality, Recommendation P.800, Aug. 1996.

ITU–T, Method for Evaluation of Service From Standpoint of Speech Transmission Quality, Recommendation P.82, 1989.

ITU–T, Subjective Performance Assessment of Telephone–Band And Wideband Digital Codecs, Recommendation P.830, Feb. 1996.

ITU–T, Subjective Listening Test Method for Evaluation Digital Circuit Multiplication and Packetized Voice Systems, Recommendation P.84, Mar. 1993.

ITU–T, Method for Subjective Performance Assessment of Quality of Speech Voice Output Devices, Recommendation P.85, Jun. 1994.

Baker, et al., "PPP Bridging Control Protocol (BCP)", Internet Engineering Task Force, Request for Comment 1638, Jun. 1994.

Chan et al., "Differentiated Services Quality of Service Policy Information Base", Internet Engineering Task Force, Request for Comment 3317, Mar. 2003.

Schulzrinne, et al., "RTP: A Transport Protocol for Real–Time Applications", Internet Engineering Task Force, Request for Comments: 1889, Jan. 1996.

ITU–T, Series G: Transmission System and Media, Digital Systems and Networks, Recommendation G.107, May 2000.

*Primary Examiner*—Curtis Kuntz
*Assistant Examiner*—Barry W Taylor

(57) ABSTRACT

A device is disclosed that uses an continuous analytical function representing mapping data relating object voice connection measurements to likely user perception of the quality of a voice connection. The device is compact and inexpensive. It can be implemented on a single integrated circuit, or on a single printed circuit board. CPU processing time is significantly reduced. The device obtains a real-time estimate of likely user perception of a given connection in terms of a user perception rating system. The device is reprogrammable, enabling it to be updated as more accurate mapping data is obtained.

61 Claims, 4 Drawing Sheets

U.S. PATENT DOCUMENTS

| | | | |
|---|---|---|---|
| 5,200,950 A | | 4/1993 | Foglar et al. |
| 5,282,203 A | | 1/1994 | Oouchi |
| 5,428,613 A | | 6/1995 | Spiotta et al. |
| 5,479,576 A | | 12/1995 | Watanabe et al. |
| 5,539,310 A | | 7/1996 | Basser et al. |
| 5,553,059 A | | 9/1996 | Emerson et al. |
| 5,572,570 A | | 11/1996 | Kuenzig |
| 5,715,372 A | * | 2/1998 | Meyers et al. ............... 706/16 |
| 5,742,929 A | | 4/1998 | Kallman et al. |
| 5,825,849 A | | 10/1998 | Garland et al. |
| 5,835,565 A | | 11/1998 | Smith et al. |
| 5,867,813 A | * | 2/1999 | Di Pietro et al. ........... 704/202 |
| 5,887,027 A | | 3/1999 | Cohen et al. |
| 5,898,668 A | | 4/1999 | Shaffer |
| 5,933,475 A | | 8/1999 | Coleman |
| 5,940,479 A | | 8/1999 | Guy et al. |
| 5,978,783 A | | 11/1999 | Meyers et al. |
| 6,041,048 A | | 3/2000 | Erickson et al. |
| 6,046,979 A | | 4/2000 | Bauman |
| 6,064,653 A | | 5/2000 | Farris |
| 6,067,350 A | | 5/2000 | Gordon |
| 6,094,464 A | | 7/2000 | Ebringer et al. |
| 6,111,949 A | | 8/2000 | Sheets et al. |
| 6,128,291 A | | 10/2000 | Perlman et al. |
| 6,147,988 A | | 11/2000 | Bartholomew et al. |
| 6,169,896 B1 | | 1/2001 | Sant et al. |
| 6,172,970 B1 | | 1/2001 | Ling et al. |
| 6,192,109 B1 | | 2/2001 | Amrany et al. |
| 6,243,373 B1 | | 6/2001 | Turock |
| 6,246,978 B1 | | 6/2001 | Hardy |
| 6,256,304 B1 | | 7/2001 | Vayrynen |
| 6,256,608 B1 | * | 7/2001 | Malvar ...................... 704/230 |
| 6,275,797 B1 | | 8/2001 | Randic |
| 6,282,192 B1 | | 8/2001 | Murphy et al. |
| 6,285,653 B1 | | 9/2001 | Koeman et al. |
| 6,304,634 B1 | * | 10/2001 | Hollier et al. ........... 379/22.02 |
| 6,353,609 B1 | | 3/2002 | Ethridge et al. |
| 6,356,601 B1 | * | 3/2002 | Chen et al. ................. 375/340 |
| 6,363,065 B1 | | 3/2002 | Thornton et al. |
| 6,377,636 B1 | | 4/2002 | Paulraj et al. |
| 6,389,005 B1 | | 5/2002 | Cruickshank |
| 6,434,606 B1 | | 8/2002 | Borella et al. |
| 6,452,922 B1 | | 9/2002 | Ho |
| 6,512,746 B1 | | 1/2003 | Sand |
| 6,574,216 B1 | | 6/2003 | Farris et al. |
| 6,618,385 B1 | | 9/2003 | Cousins |
| 6,633,545 B1 | | 10/2003 | Milbrandt |
| 6,665,271 B1 | | 12/2003 | Thomas et al. |
| 2002/0114296 A1 | | 8/2002 | Hardy |

* cited by examiner

METHOD AND APPARATUS FOR ESTIMATING QUALITY IN A TELEPHONIC VOICE CONNECTION

CROSS-REFERENCE TO RELATED APPLICATIONS

This is a continuation-in-part of U.S. patent application Ser. No. 09/220,733 filed on Dec. 24, 1998 now U.S. Pat. No. 6,370,120, the content of which is relied upon and incorporated herein by reference in its entirety, and the benefit of priority under 35 U.S.C. §120 is hereby claimed. This application is also related to U.S. patent application Ser. No. 09/778,186 filed on Feb. 7, 2001, a "Method and System for Evaluating the Quality of Packet Switched Voice Signals" by William Christopher Hardy.

BACKGROUND OF THE INVENTION

1. Field of the Invention

The present invention relates generally to telecommunications, and particularly to a method and system for evaluating the quality of voice signals.

2. Technical Background

Telephone connections have always been subject to impairments in the form of noise, attenuation, distortion, cross-talk and echo. Such impairments are particularly common to analog portions of the network, such as subscriber loops and frequency domain multiplexing equipment. Digital transmission alleviates any of these problems but also introduces quantization noise and distortions due to bit errors in the digital signal. However, even with perfect digital transmission applied to long haul transmissions, a typical telephone connection includes many analog components, wherein impairments can occur.

A poor connection or malfunctioning piece of equipment can produce conditions that a telephone customer will find objectionable or intolerable. When there is a high incidence of poor connections, customers may complain to the service provider or to a regulatory authority, or simply change long distance carriers. Thus, perceived quality of telephone connections is a major factor affecting the reputation and marketability of long distance telephone services.

To guard against poor quality, service providers have developed methods to obtain objective quality measurements upon a line, piece of equipment, or an end-to-end telephone connection. These measurements can help the service provider detect and gauge impairments, pinpoint weak elements, and correct deficiencies that degrade user perception of quality. The effects of extreme fault conditions on user perception of quality is clear. There are easily discernable thresholds for "no effect" and "substantial degradation" conditions. Unfortunately, for intermediate objective quality measurements, there is no clear division between values representing acceptable and unacceptable voice connection quality.

In one approach that was discussed in the parent application, mappings were created between objective measurements and user perceived quality ratings. A set of objective characteristics for a telephonic connection were obtained. Test signals were produced by varying each element in the set of objective characteristics, and by varying various combinations of the objective characteristics. Each test signal was subjectively rated by a large group of evaluators using a "no impairment," "some impairment," or "much impairment" rating system. These data mappings were synthesized by constructing a look-up table. The quality of a telephonic connection can be assessed using this mapping system. When a set of objective measurements for a telephonic connection are obtained, the look-up tables can be used to provide a network analyst with an estimate of the perceived quality level for the connection. This mapping system is a powerful tool for analyzing reported impairments, or for testing new network plant or equipment before deployment.

However, there are several shortcomings associated with the approaches described above. Although look-up tables can be used to store the mapping data, it would be difficult to use them to provide a device capable of real time processing to produce measurements. The use of a look-up table that contains all of the mappings would substantially increase memory requirements and necessitate a prohibitive amount of processing. The CPU in such a device would be required to perform a large number of operations. Because the contents of the look-up table are discrete mappings, the accuracy of a real time estimate may be poor.

Thus, what is needed is a device that uses an analytical representation of the mapping tables. In other words, the mapping data in the data tables would be modeled as a continuous analytical transform. This would significantly reduce costs, and the size of a resultant voice quality estimation device. By using a continuous mathematical function, CPU processing time would be significantly reduced, allowing the device to obtain a real-time estimate of likely user perception of a given connection in terms of the user perception rating system described above. Finally, a reprogrammable device is needed that can be updated as more accurate mapping data is obtained.

SUMMARY OF THE INVENTION

The present invention includes a device that uses an continuous analytical function representing the above described mapping tables. The device is compact and inexpensive. It can be implemented on a single integrated circuit, or on a single printed circuit board. CPU processing time is significantly reduced. The device obtains a real-time estimate of likely user perception of a given connection in terms of the user perception rating system described above. Finally, the device and system processes are readily reprogrammable by specification of configuration parameters, enabling it to be updated as more accurate mapping data is obtained.

One aspect of the present invention is a device for evaluating quality in a telephonic voice connection in a telecommunications network. The device includes a measurement circuit operative to measure at least one characteristic of the telephonic voice connection. A processor is coupled to the measurement circuit, the processor being operative to calculate a solution to at least one empirically derived mathematical function by using the at least one measured characteristic as an independent variable in the at least one empirically derived mathematical function, whereby the solution is an estimate of likely user perception of the quality of the telephonic voice connection.

In another aspect, the present invention includes a method for evaluating quality in a telephonic voice connection in a telecommunications network. The method includes establishing a telephonic voice connection. At least one characteristic of the telephonic voice connection is measured. A solution to at least one empirically derived mathematical function is calculated by using the at least one measured characteristic as an independent variable in the at least one empirically derived mathematical function, whereby the solution is an estimate of likely user perception of the quality of the telephonic voice connection.

In another aspect, the present invention includes a programmable device for evaluating quality in a telephonic voice connection in a telecommunications network. The device includes a memory operative to store at least one empirically derived mathematical function having at least one independent variable. A processor is coupled to the memory, the processor being operative to calculate a solution to the at least one empirically derived mathematical function by using at least one measured characteristic as the independent variable, whereby the solution is an estimate of likely user perception of the quality of the telephonic voice connection. An interface control circuit is coupled to the memory, the interface control circuit being adapted to receive a revised at least one empirically derived mathematical function from an external device, and store the revised at least one empirically derived mathematical function in the memory.

In another aspect, the present invention includes a method for fabricating a device for evaluating quality in a telephonic voice connection in a telecommunications network. The method includes empirically acquiring user perception data by having at least one test subject listen to a plurality of test messages, and rate the quality of each test message in accordance with at least one user perceived impairment characteristic. The user perception data is modeled as at least one mathematical function, the at least one mathematical function being graphically represented by a two dimensional curve having a shape, the shape of the curve being determined by a set of constants employed in the at least one mathematical function. Values are chosen for the set of constants to thereby fit the two-dimensional curve to the user perception data to thereby generate at least one empirically derived mathematical function. The at least one empirically derived mathematical function is converted into a set of computer executable instructions. The device is programmed with the set of computer executable instructions.

In another aspect, the present invention includes a computer readable medium having computer executable instructions for performing a method. The method includes establishing a telephonic voice connection. At least one characteristic of the telephonic voice connection is measured. A solution is calculated for the at least one empirically derived mathematical function by using at least one measured characteristic as an independent variable of the at least one empirically derived mathematical function.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
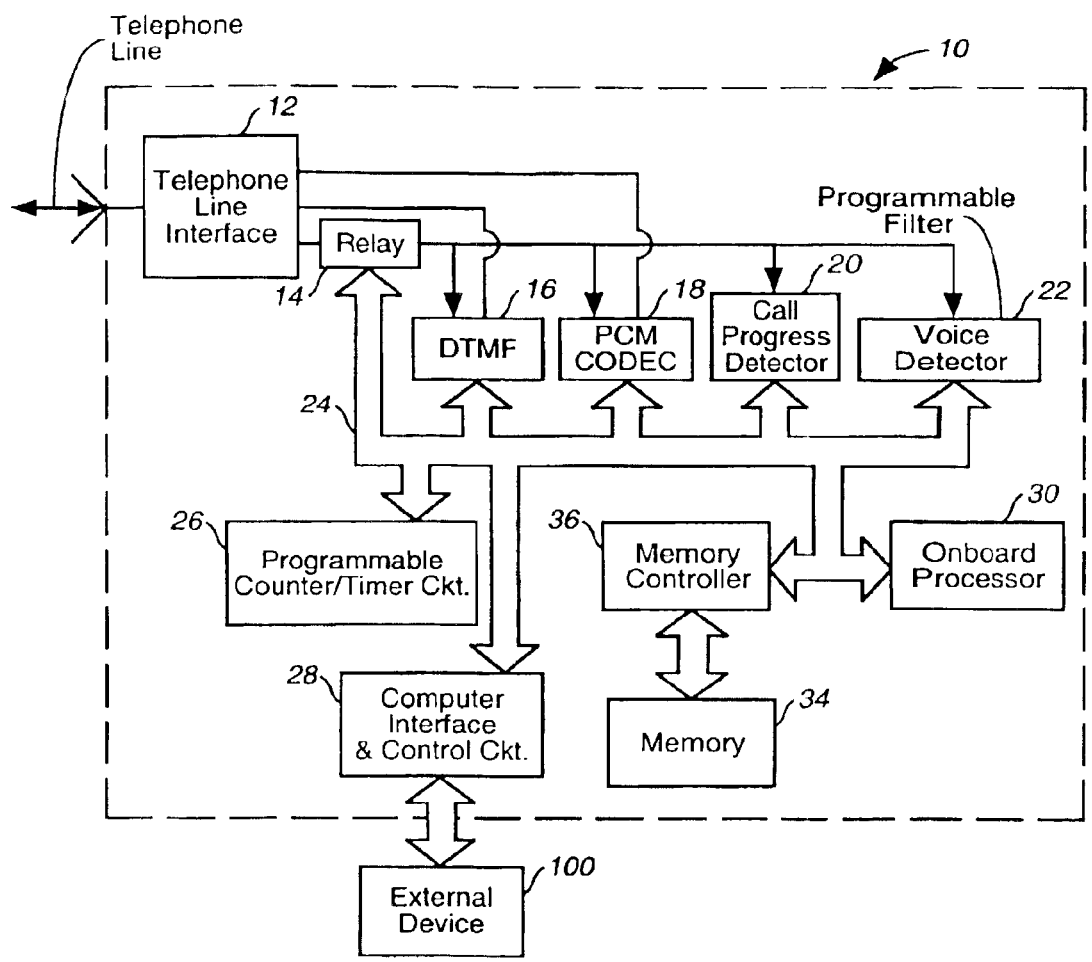
FIG. 1 is a diagrammatic depiction of the voice quality estimation device in accordance with the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the device for estimating telephonic voice connection impairments of the present invention is shown in FIG. 1, and is designated generally throughout by reference numeral 10. In accordance with the invention, the present invention for a device for estimating user perception of the quality of a telephonic voice connection includes a processor coupled to a measurement circuit. The processor is operative to calculate a solution to at least one empirically derived mathematical function by using at least one measured characteristic as an independent variable in the at least one empirically derived mathematical function. The solution is an estimate of likely user perception of the quality of the telephonic voice connection. The at least one empirically derived mathematical function is an analytical representation of the above described mapping data. As a result, the device is compact and inexpensive. It can be implemented on a single integrated circuit, or as a single printed circuit board. CPU processing time is significantly reduced. The device obtains a real-time estimate of likely user perception of a given connection in terms of the user perception rating system described above. Finally, the device is reprogrammable by specifying new parameters, enabling it to be updated as more accurate mapping data is obtained. These parameters are the coefficients that define the mathematical function. In another embodiment, the coefficients are changed using on-board processing by including a processing routine that operates on another set of parameters in volatile memory to produce the coefficients.

As embodied herein, and depicted in FIG. 1, a diagrammatic depiction of device 10 for estimating user perception of the quality of a telephonic voice connection in accordance with the present invention is disclosed. Device 10 includes telephone line interface 12 which connects device 10 to a telephone line in the network. In one embodiment, interface 12 is adapted to interface with network by means of an RJ-11 telephone jack. Interface 12 is coupled to relay 14. Relay 14 is a conventional relay that distributes signals received from interface 12 to DTMF 16, PCM codec 18, call progress detector 20, and voice detector 22. Each of the above listed components are internally coupled by system bus 24. Device 10 also may include programmable counter/timer circuit 26. System bus 24 is also coupled to computer interface circuit 28, processor 30, and memory controller 36. Memory controller 36 is coupled to memory 34, which is used to store computer executable instructions.

Telephone line interface 12 may be of any suitable type, but by way of example, interface 12 includes an integrated circuit such as a Motorola MC3401OP coupled to isolation transformers to prevent any grounding problems. Signals from the network are translated by interface 12 into signals having a correct format and amplitude. Interface 12 may also include a buffer amplifier and an adjustable potentiometer to provide optimal signal levels.

DTMF (dual tone multi-frequency) transceiver 16 is operative to generate and detect audible tones associated with a telephone network. DTMF 16 is also adapted to generate DTMF dialing tones to initiate a call through the telephone line coupled to interface 12. DTMF 16 detects DTMF tones received from the telephone line via interface 12.

PCM codec transceiver 18 uses a standard digitization scheme to band limit voice frequencies to the 300–3300 Hz frequency band. Codec 18 performs an A/D conversion of an analog voice message using a $\mu$-law companding scheme. When sampling the analog waveform, larger amplitudes are compressed relative to the smaller amplitudes, providing an equivalent 12-bit accuracy within an 8-bit digital word. The 8-bit words generated by codec 18 can be stored in a RAM portion of memory 34 or in a memory resident in processor 30. In one embodiment, codec 18 includes a semiconductor IC manufactured by SGS Thompson or by the National Semiconductor Company having the product number ETC5056, or equivalent.

Call Progress Detector 20 is operative to continuously monitor call progress information being fed to device 10. Detector 20 is tuned to a particular frequency band (e.g., 300–630 Hz) where most of the fundamental energies of the call progress information reside. The duration of incoming signals such as dial tone, ring back, busy, or fast busy are recorded. Detector 20 monitors the frequency band of interest and looks for the duration of on and off times, and classifies the examined signal as one of the above noted tones.

Voice detect circuit 22 is fabricated using standard operation amplifier circuits to detect signals in the band between 750 Hz and 4 KHz. When a voice waveform is detected, the output within this frequency band is amplified and translated into a digital signal by codec 18. Voice detection may also trigger a response such that a test message is retrieved from memory 34 and converted into an analog signal by codec 18 for transmission over the telephone connection.

In yet another embodiment, the output of a detector showing power/no power on a number of different filters to accomplish the functions described for call progress controller and voice detection circuit 22. Reference is made to U.S. Pat. No. 5,241,584, which is incorporated herein by reference as though fully set forth in its entirety, for a more detailed explanation of this component.

Programmable counter/timer 26 may be of any suitable type providing timing signals of various frequencies as required by the components in device 10. A timing crystal is coupled to programmable counter/timer 26. All of the frequencies generated by counter/timer 26 are synchronous with the base frequency generated by the timing crystal. Programmable counter/timer 26 generates the system clock signal provided by bus 24 and used by processor 30.

Memory 34 may be of any suitable type, but by way of example includes a read/write random access memory (RAM) used in data processing and data I/O, and an erasable read only memory for storing device 10 programming instructions used by processor 30 and co-processor 32. The memory used to store the programming instructions can be implemented using a DRAM, PROM, EEPROM, hard drive, compact disk, or any computer readable medium. Memory controller 36 controls the requests from the various components in device 10 on bus 24.

Computer interface 28 is adapted to communicate with external device 100. The programming instructions stored in memory 34 can be completely replaced or partially replaced with new instructions down loaded from external device 100. As more research is performed, the empirical data used to formulate the instructions stored in memory 34 may become outdated. If so, device 10 can be returned to a central location and reprogrammed with instructions representing the latest empirical data. In another embodiment, the device can be reprogrammed by simply entering new data via a keyboard (not shown). In this embodiment, the empirical mapping data takes the form of constants used to shape a cumulative probability distribution function. In order to reprogram device 10, an operator in the field need only input a new set of constants. The nature of the cumulative probability distribution function will be discussed in more detail below.

In one embodiment processor 30 is implemented using an 8-bit semiconductor chip such as the 80486 IC manufactured by Intel. This is more than adequate since the calculations performed by processor 30 do not require much processing power. Thus, the present invention can be implemented using the lowest cost components on the market. However, one of ordinary skill in the art will recognize that 16-bit, or even 32-bit machines can be used to implement processor 30, depending on speed, cost and other design considerations. Those of ordinary skill in the art will also recognize that processor 30 can be implemented using an application specific integrated circuit (ASIC). In another embodiment processor 30 is implemented using a 4-bit processor. In this alternative embodiment, processor 30 merely controls and effects the recording of the received signal so less processing power is required. The recording is transmitted to external host processor 100. One benefit of this approach is that the data interpretation software can be easily changed. In the first embodiment discussed above, the firmware resident in memory 34 has to be changed, unless the processing routine for recalculating the coefficients is included.

Figure 2:
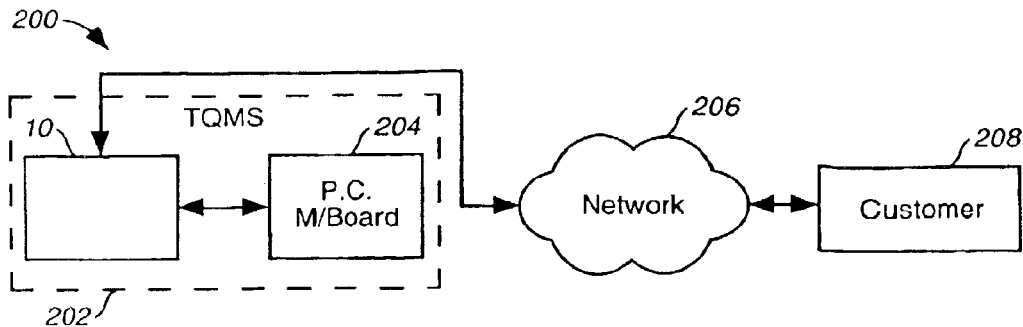
FIG. 2 is an example of the voice quality estimation device being used in a Telephonic Quality Measurement System (TQMS)

As embodied herein and depicted in FIG. 2, an example of device 10 being used in Telephone Quality Measurement System (TQMS) environment 200 is disclosed. In this embodiment, device 10 is implemented as a circuit board connected to motherboard 204 within TQMS personal computer platform 202. Device 10 is coupled to network 206 enabling recordings of signals received over the network to be passed to TQMS platform 204. Network 206 may be a circuit switched network, a packet switched network, or a hybrid that includes both. Network 206 is coupled to customer 208. In this example, customer 208 may be a customer who has filed a complaint, or a new customer. Referring back to FIG. 1, processor 30 directs interface 12 and DTMF 16 to establish a voice connection with customer 208. Subsequently, a recorded message stored in memory 34 is converted into an analog signal by codec 18. The message directs the customer to respond in various ways to message prompts to thereby obtain a voice sample and a quiet channel sample. From the voice sample and the quiet channel sample, device 10 can obtain measurements of objective characteristics such as C-message noise, magnitude of average power of speech, magnitude of average power of a quiet channel, echo path delay, echo path loss, a speech distortion indicator, and a dropped frame rate in a packet switched network. Processor 30 uses the objective measurement as the independent variable of the empirically derived mathematical functions stored in memory 34 to calculate solutions to the empirically derived mathematical functions. Device 10 provides TQMS 202 with likely user perception data including an estimate of the percentage of users that would deem the voice connection to have no impairment, some impairment, and much impairment. In one embodiment, device 10 performs all of the processing, and merely transmits the results to external device 100. This embodiment is enabled by the processing efficiencies realized by the method of the present invention. The look-up process is reduced to retrieving the few parameters used in evaluating the mathematical functions. The current model is changed by writing replacement parameters into memory 34. In an alternate embodiment, PC motherboard 204, and the resident memory thereon, are the destination of the recordings captured by device 10. Thus, in the alternate embodiment, PC 204 represents external device 100 depicted in FIG. 1.

Figure 3:
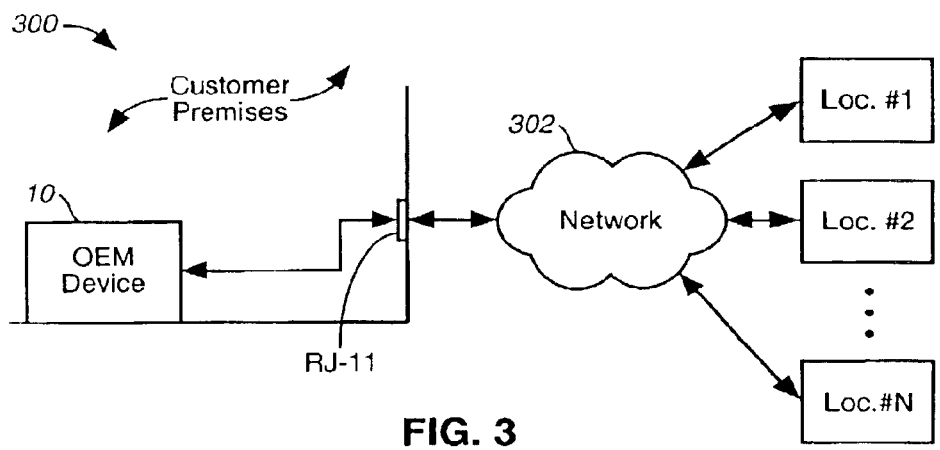
FIG. 3 is an example of the voice quality estimation device being used as OEM equipment at a customer's premises.

As embodied herein and depicted in FIG. 3, an example of device 10 being used as an OEM equipment in customer premises environment 300 is disclosed. In this example OEM device 10 is plugged into RJ-11 jack at the customer's premises to provide a physical connection to network 302. Network 302 is connected to a plurality of network customers LOC#1, LOC#2, through LOC#N. In this scenario, the customer may have acceptable service when calling some telephone numbers, and unacceptable service when calling others. OEM device 10 can be programmed to call these telephone numbers, or any suite of numbers for that matter. OEM device 10 operates as described above to obtain the user perception data for each connection, allowing analysts to pin-point that portion of network 302 that is malfunctioning.

Figure 4:
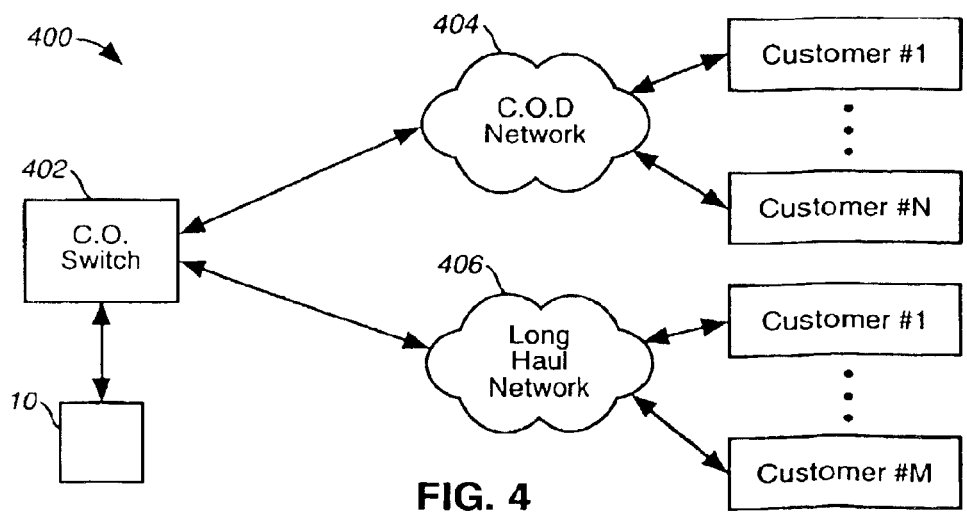
FIG. 4 is an example of the voice quality estimation device being used in a central office environment.

As embodied herein and depicted in FIG. 4, an example of device 10 being used in central office environment 400 is disclosed. In this example, device 10 is implemented as single IC (a microprocessor or an ASIC) that is disposed on a circuit board within central office switch 402. Alternatively, device 10 is implemented as a printed circuit board coupled to switch 402. Switch 402 is coupled to the central office district network 404, and/or a long haul network 406. This application is a powerful one because it allows central office switch 402 to obtain an estimate of user perception of the quality of any voice connection made by switch 402. Device 10 provides switch 402 with the percentage of users that would likely characterize the connection as having no impairment, some impairment, and much impairment with respect to at least one impairment measured by an objective assignment of values. The sum of the percentages must equal 100%. For example, a connection under test may be characterized as: 10% of users likely to find no impairment; 85% of users likely to find some impairment; and 5% of users likely to find much impairment. Device 10 can be used to test new plant, or an existing portion of a network.

Figure 5:
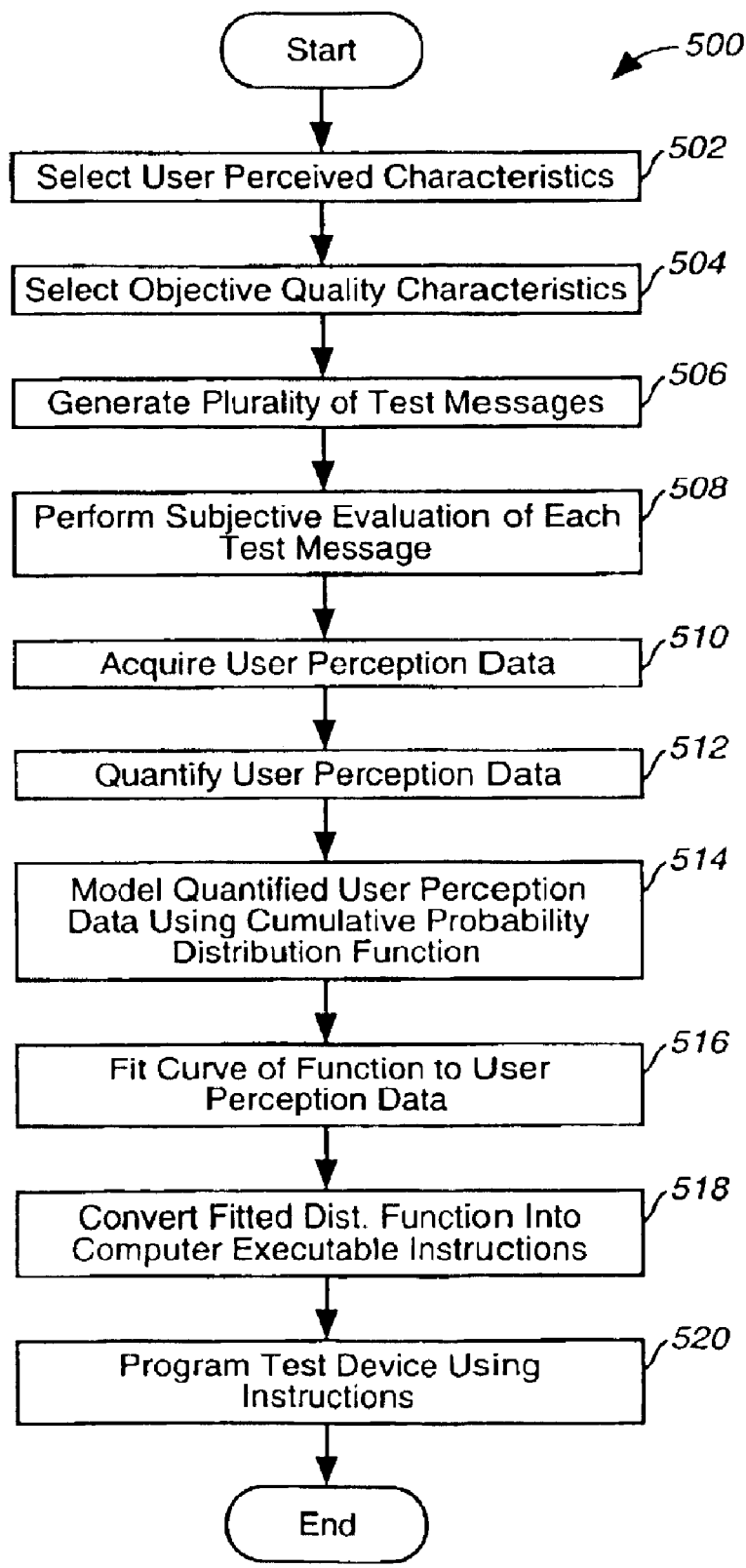
FIG. 5 is a flow chart showing a method for making the voice quality estimation device of the present invention.

As embodied herein and depicted in FIG. 5, a flow chart showing a method for making a voice quality estimation device 10 is disclosed. Reference is made to parent U.S. patent application Ser. No. 09/220,733 which is incorporated herein by reference as though fully set forth in its entirety, for a more detailed explanation of steps 502–512.

In step 502, user perceived characteristics are selected to broadly characterize the variety of voice impairments that might be manifested in a telephonic voice connection. Test subjects are instructed to rate a voice connection as having "no impairment" if the test subject cannot detect the presence of an impairment. A test subject is instructed to rate a voice connection as having "much impairment" if an impairment is present and noticeable. A test subject is instructed to rate a voice connection as having "some impairment"if the degree of impairment is somewhere in between.

The subjective user perceived characteristics must be tied to objective characteristics. In step 504, objective quality characteristics of a voice connection are selected. Objective quality characteristics are voice connection characteristics that can be measured. They include: C-message noise, magnitude of average power of speech, magnitude of average power of a quiet channel, echo path delay, echo path loss, a speech distortion indicator, and a dropped frame rate in a packet switched network.

In step 506, a plurality of test messages are generated. Each test message has a different combination of C-message noise, average power of speech, average power of quiet channel, echo path delay, echo path loss, distortion, or dropped frames(in a packet switched environment).

In step 508, subjective test subjects are used to evaluate the each message. Each evaluator will listen to the series of test messages, which may be received in calls placed over a network in use, and rate each one in accordance with the "none," "some," or "much" standard. In step 510, the user perception data generated in step 508 is collected, and quantified in step 512 to thereby produce data tables summarizing the percentages of user reports of none, some, and much impairment for each interval of the objectively measured voice connection characteristics.

In step 514, the mapping data is modeled as a continuous analytical transform. $P_m$ is defined as the likely percentage of users that would characterize a given voice connection as having much impairment. $P_n$ is defined as the likely percentage of users that would characterize a given voice connection as having no impairment. $P_s$ is defined as the likely percentage of users that would characterize a given voice connection as having some impairment.

$P_m$ is modeled as a smooth cumulative probability distribution function which takes on the value zero (0) for the best measured results and asymptotically increases to one (1) as the measured results become worse. The smooth cumulative probability distribution functions takes the form of an "s" curve which is expressed by the mathematical function:

$$P_m = 1 - \exp[-a(x-c)^b] \qquad (1)$$

$P_n$ is modeled as a smooth cumulative probability distribution function which takes on the value one (1) for the best measured results and asymptotically decreases to zero (0) as the measured results become worse. The smooth cumulative probability distribution function takes the form of an inverse "s" curve which is expressed by the mathematical function:

$$P_n = \exp[-d(x-c)^e]. \qquad (2)$$

$P_s$ is a Normal distribution that achieves its maximum value somewhere between the extreme points set for the curves describing $P_n$ and $P_m$. As a result of equations (1) and (2), $$P_s = 1 - (P_n + P_m), \qquad (3)$$

$$P_s = \exp[-a(x-c)^b] - \exp[-d(x-c)^e]. \qquad (4)$$

Figure 6:
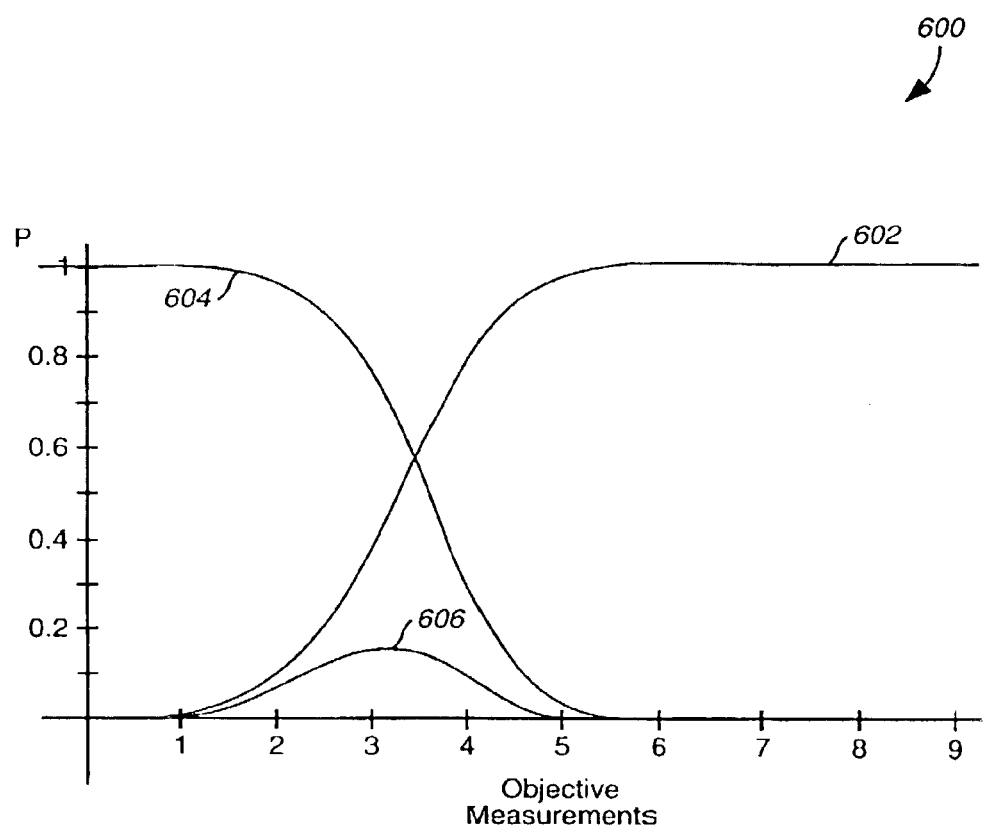
FIG. 6 is a plot of the empirically derived mathematical functions.

FIG. 6 is a plot of the curves for equations $P_n$, $P_m$, and $P_s$. Reference 602 is a plot of equation (1). Reference 604 is a plot of equation (2). Reference number 606 is a plot of equation (3).

Referring to step 516 in FIG. 5, equations (1), (2), and (4) are fit to the empirical data in the data tables by using analytical and heuristic data fitting routines. These routines produce the desired continuous representation of the transition from $P_n=1$ to $P_m=1$ as the objective measured characteristic changes from very good to very bad. Data fitting routines such as those used in step 516 are well known to those of ordinary skill in the art. Essentially, a, b, and c in equations (1) and (4), and c, d, and e in equations (2) and (4), are constants that control the shape of curves 602, 604, and 606, in FIG. 6. These constants are programmed into device before use. The data fitting routines discussed above choose constants a, b, d, and e to thereby obtain empirically derived mathematical functions for $P_n$, $P_m$, and $P_s$, The constant "c" is a value for the objective measurement for which one would expect that there should be no complaint of impairment. For example, if the objective measure is C-message noise, setting x=c=5 dBrnc, would result in a percentage of users deeming the connection to have no impairment at close to 100%. Thus, x is the independent variable. The measured objective characteristic is plugged into equations (1), (2), and (4) to calculate the estimates of user percentages for the none, some, and much categories.

In another embodiment, step 516 is implemented on-chip by including a processing routine. The processing routine uses empirical data written into volatile memory to calculate coefficients a–e.

In steps 518 and 520, the empirically derived mathematical functions for $P_n$, $P_m$, and $P_s$ are converted into computer executable instructions and loaded into the device. The term "computer executable instructions" should be construed to include programming instructions for a microprocessor or some other computing device, a programmable logic array, or configuring the circuitry of an ASIC. The step of loading should be construed to cover writing instructions to any memory device, such as a DRAM, ROM, PROM, EEPROM, a hard drive, or some other information bearing device. It should also be construed to cover configuring the gate arrays or other structures in a programmable logic device.

One of ordinary skill in the art will recognize that steps 502 to 512 are preliminary steps. The compactly defined function obtained in step 514 represents the data obtained in steps 502 to 512.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A device for evaluating quality in a telephonic voice connection in a telecommunications network, the device comprising:
  a measurement circuit operative to measure at least one characteristic of the telephonic voice connection; and
  a processor coupled to the measurement circuit, the processor being operative to:
    calculate a solution to a first mathematical function based on the at least one measured characteristic, the first mathematical function corresponding to an estimate of a percentage of likely users who would characterize the telephonic voice connection as having much impairment, and
    calculate a solution to a second mathematical function based on the at least one measured characteristic, the second mathematical function corresponding to an estimate of a percentage of likely users who would characterize the telephonic voice connection as having one of some or no impairment.

2. The device of claim 1, wherein the first and second mathematical functions are cumulative probability distribution functions.

3. The device of claim 1, wherein the second mathematical function includes a first function ($P_N$) representing a proportion of users who will perceive the telephonic voice connection as having no impairment and a second function ($P_S$) representing a proportion of users who will perceive the telephonic voice connection as having some impairment, and the first mathematical function includes a third function ($P_M$) representing a proportion of users who will perceive the telephonic voice connection as having much impairment, where $P_N+P_S+P_M=1$.

4. The device of claim 3, wherein the first function includes the equation $$P_N = \exp[-a(x-c)^b].$$

5. The device of claim 4, wherein a and b are empirically derived constants, and c represents a noise level that substantially all users would perceive as being acceptable.

6. The device of claim 3, wherein the third function includes the equation $$P_M = 1 - \exp[-d(x-c)^e].$$

7. The device of claim 6, wherein d and e are empirically derived constants, and c represents a noise level that substantially all users would perceive as being acceptable.

8. The device of claim 3, wherein the second function is characterized by the equation $$P_S = \exp[-d(x-c)^e] - \exp[-a(x-c)^b].$$

9. The device of claim 8, wherein a, b, d and e are empirically derived constants, and c represents a noise level that substantially all users would perceive as being acceptable.

10. The device of claim 1, wherein the at least one characteristic includes at least one of C-message noise, magnitude of average power of speech, magnitude of average power of a quiet channel, echo path delay, echo path loss, a speech distortion indicator, or a dropped frame rate in a packet switched network.

11. The device of claim 1, wherein the network is a packet switched network.

12. The device of claim 1, wherein the network is a circuit switched network.

13. The device of claim 1, further comprising a network interface coupled to the measurement circuit, the network interface being operative to establish the telephonic voice connection between the device and the network.

14. The device of claim 1, further comprising:
  a memory operative to store the first and second mathematical functions; and
  an interface control circuit coupled to the memory, the interface control circuit being adapted to receive at least one revised mathematical function from an external device, and store the at least one revised mathematical function in the memory.

15. The device or claim 1, wherein the telecommunications network includes a circuit switched telecommunications network.

16. The device of claim 1, wherein the telecommunications network includes a packet switched telecommunications network.

17. The device of claim 1, wherein the device is part of a telecommunications switching device.

18. A method for evaluating quality in a telephonic voice connection in a telecommunications network, the method comprising:
   establishing a telephonic voice connection;
   measuring at least one characteristic of the telephonic voice connection; and
   calculating solutions to a plurality of empirically derived mathematical functions based on the at least one measured characteristic, the empirically derived mathematical functions comprising at least two of:
      a first function ($P_N$) representing an estimate of a proportion of users who will perceive the telephonic voice connection as having no impairment;
      a second function ($P_S$) representing an estimate of a proportion of users who will perceive the telephonic voice connection as having some impairment, or
      a third function ($P_M$) representing an estimate of a proportion of users who will perceive the telephonic voice connection as having much impairment.

19. The method of claim 18, wherein $P_N + P_S + P_M = 1$.

20. The method of claim 18, wherein the first function includes the equation:

$$P_N = \exp[-a(x-c)^b],$$

where a and b are empirically derived constants and c represents a noise level that substantially all users would perceive as being acceptable.

21. The method of claim 18, wherein the third function includes the equation:

$$P_M = 1 - \exp[-d(x-c)^e],$$

where d and e are empirically derived constants and c represents a noise level that substantially all users would perceive as being acceptable.

22. The method of claim 18, wherein the second function includes the equation:

$$P_S = \exp[-d(x-c)^e] - \exp[-a(x-c)^b],$$

where a, b, d and e are empirically derived constants and c represents a noise level that substantially all users would perceive as being acceptable.

23. The method of claim 18, further comprising:
   providing a device for evaluating quality in a telephonic voice connection in a telecommunications network, the device includes a processor that is operative to calculate the solutions to the empirically derived mathematical functions by using the at least one characteristic as an independent variable in the empirically derived mathematical functions.

24. The method of claim 23, further comprising:
   using the device to evaluate a portion of the telecommunications network.

25. The method of claim 24, wherein the portion of the telecommunications network is in service.

26. The device of claim 18, wherein the at least one characteristic includes at least one of C-message noise, magnitude of average power of speech, magnitude of average power of a quiet channel, echo path delay, echo path loss, a speech distortion indicator, or a dropped frame rate in a packet switched network.

27. The device of claim 18, wherein the network is a packet switched network.

28. The device of claim 18, wherein the network is a circuit switched network.

29. A programmable device for evaluating quality in a telephonic voice connection in a telecommunications network, the device comprising:
   a memory operative to store at least one mathematical function including at least one independent variable;
   a processor coupled to the memory, the processor being operative to calculate a solution to the at least one mathematical function by using at least one measured characteristic as the independent variable, whereby the solution is an estimate of the quality of the telephonic voice connection based on at least one of an estimate of a proportion of users who will perceive the telephonic voice connection as having no impairment, an estimate of a proportion of users who will perceive the telephonic voice connection as having some impairment, or an estimate of a proportion of users who will perceive the telephonic voice connection as having much impairment; and
   an interface control circuit coupled to the memory, the interface control circuit being adapted to receive a revised mathematical function from an external device, and store the revised mathematical function in the memory, the processor being configured to use the revised mathematical function to re-estimate the quality of the telephonic voice connection.

30. The programmable device of claim 29, further comprising:
   a network interface, the network interface being operative to establish the telephonic voice connection between the device and the network; and
   a measurement circuit coupled to the network interface, the measurement circuit being operative to measure the at least one measured characteristic of the telephonic voice connection.

31. The programmable device of claim 29, wherein the at least one mathematical function includes the equation:

$$P_N = \exp[-a(x-c)^b],$$

where $P_N$ represents a proportion of users who will perceive the telephonic voice connection as having no impairment, a and b are empirically derived constants, and c represents a noise level that substantially all users would perceive as being acceptable.

32. The programmable device of claim 29, wherein the at least one mathematical function includes the equation:

$$P_M = 1 - \exp[-d(x-c)^e],$$

where $P_M$ represents a proportion of users who will perceive the telephonic voice connection as having much impairment, d and e are empirically derived constants, and c represents a noise level that substantially all users would perceive as being acceptable.

33. The programmable device of claim 29, wherein the at least one mathematical function includes the equation:

$$P_S = \exp[-d(x-c)^e] - \exp[-a(x-c)^b],$$

where $P_S$ represents a proportion of users who will perceive the telephonic voice connection as having some impairment, a, b, d and e are empirically derived constants, and c represents a noise level that substantially all users would perceive as being acceptable.

34. The device of claim 29, wherein the at least one characteristic includes at least one of C-message noise, magnitude of average power of speech, magnitude of average power of a quiet channel, echo path delay, echo path loss, a speech distortion indicator, or a dropped frame rate in a packet switched network.

35. The device of claim 29, wherein the network is a packet switched network.

36. The device of claim 29, wherein the network is a circuit switched network.

37. A method for fabricating a device for evaluating quality in a telephonic voice connection in a telecommunications network, the method comprising:
    empirically acquiring user perception data by having at least one test subject listen to a plurality of test messages, and rate the quality of each test message in accordance with at least one user perceived impairment characteristic;
    modeling the user perception data as at least one mathematical function, the at least one mathematical function being graphically represented by a two dimensional curve having a shape, the shape of the curve being determined by a set of constants employed in the at least one mathematical function;
    choosing values for the set of constants to thereby fit the two-dimensional curve to the user perception data to thereby generate at least one empirically derived mathematical function;
    converting the at least one empirically derived mathematical function into a set of computer executable instructions; and
    programming the device with the set of computer executable instructions.

38. The method of claim 37, wherein empirically acquiring user perception data further comprises:
    selecting a plurality of user perceived impairment characteristics;
    selecting a plurality of quality characteristics of the voice signal, each of the quality characteristics affecting the quality of the voice signal as perceived and described by users;
    generating a plurality of voice messages by varying selected ones of the plurality of quality characteristics;
    acquiring user perception data by having the at least one test subject listen to the plurality of voice messages, the at least one test subject rating the quality of the plurality of voice messages in accordance with the plurality of user perceived impairment characteristics; and
    transforming the each of the plurality of user perceived impairment characteristics into quantifications of each of the plurality of objective characteristics.

39. The method of claim 38, wherein the plurality of objective characteristics include at least two of C-message noise, magnitude of average power of speech, magnitude of average power of a quiet channel, echo path delay, echo path loss, a speech distortion indicator, or a dropped frame rate in a packet switched network.

40. The method of claim 38, wherein the plurality of user perceived impairment characteristics include at least two of volume level, noise level, speech distortion, or echo.

41. The method of claim 40, wherein the plurality of user perceived impairment characteristics are transformed into estimates, each estimate being a proportion of a population of users who would describe the telephonic voice connection as having no impairment, some impairment, or much impairment.

42. The method of claim 38, wherein the at least one empirically derived mathematical function includes a first function ($P_N$) representing a proportion of users who will perceive the telephonic voice connection as having no impairment, a second function ($P_S$) representing a proportion of users who will perceive the telephonic voice connection as having some impairment, and a third function ($P_M$) representing a proportion of users who will perceive the telephonic voice connection as having much impairment, where $P_N+P_S+P_M=1$.

43. The method of claim 42, wherein the first function is characterized by the equation, $$P_N=\exp[-a(x-c)^b].$$

44. The method of claim 43, wherein a and b are empirically derived constants, and c represents a noise level that substantially all users would perceive as being acceptable.

45. The method of claim 42, wherein the third function is characterized by the equation, $$P_M=1-\exp[-d(x-c)^e].$$

46. The method of claim 45, wherein d and e are empirically derived constants, and c represents a noise level that substantially all users would perceive as being acceptable.

47. The method of claim 42, wherein the second function is characterized by the equation, $$P_S=\exp[-d(x-c)^e]-\exp[-a(x-c)^b].$$

48. The method of claim 47, wherein a, b, d and e are empirically derived constants, and c represents a noise level that substantially all users would perceive as being acceptable.

49. A computer readable medium having computer executable instructions for performing a method, the method comprising:
    establishing a telephonic voice connection;
    measuring at least one characteristic of the telephonic voice connection; and
    determining a quality of the telephonic voice connection based on a first function ($P_N$) representing an estimate of a proportion of users who will perceive the telephonic voice connection as having no impairment, a second function ($P_S$) representing an estimate of a proportion of users who will perceive the telephonic voice connection as having some impairment, and a third function ($P_M$) representing an estimate of a proportion of users who will perceive the telephonic voice connection as having much impairment, the first, second, and third functions being based on the at least one measured characteristic.

50. The method of claim 49, wherein $P_N+P_S+P_M=1$.

51. The method of claim 49, wherein the first function includes the equation:

$$P_N=\exp[-a(x-c)^b],$$

where a and b are empirically derived constants, and c represents a noise level that substantially all users would perceive as being acceptable.

52. The method of claim 49, wherein the third function includes the equation:

$$P_M=1-\exp[-d(x-c)^e],$$

where d and e are empirically derived constants, and c represents a noise level that substantially all users would perceive as being acceptable.

53. The method of claim 49, wherein the second function includes the equation:

$$P_S = \exp[-d(x-c^e)] - \exp[-a(x-c)^b],$$

where a, b, d and e are empirically derived constants, and c represents a noise level that substantially all users would perceive as being acceptable.

54. The method of claim 49, wherein the computer readable medium includes one of a DRAM, ROM, PROM, EEPROM, a hard drive, or compact disk.

55. The method of claim 49, wherein the method is performed by a telecommunications switching device coupled to the computer readable medium.

56. The method of claim 55, wherein the telecommunications switching device is disposed in a central office in a telecommunications network.

57. The method of claim 55, wherein the telecommunications switching device is a circuit switch.

58. The method of claim 55, wherein the telecommunications switching device is a packet switch.

59. The method of claim 49, wherein the method is performed by a Test Quality Measurement System (TQMS) coupled to the computer readable medium.

60. The method of claim 49, wherein the method is performed by a OEM equipment coupled to the computer readable medium.

61. A programmable device for evaluating quality in a telephonic voice connection in a telecommunications network, the device comprising:

a memory operative to store at least one empirically derived mathematical function having at least one independent variable;

an interface control circuit coupled to the memory, the interface control circuit being adapted to receive revised empirically derived data from an external device, and store the revised empirically derived data in the memory; and a processor coupled to the memory, the processor being programmed to calculate a revised at least one empirically derived mathematical function using the revised empirically derived data, and calculate a solution to the revised at least one empirically derived mathematical function by using at least one measured characteristic as the independent variable, whereby the solution is an estimate of likely user perception of the quality of the telephonic voice connection.

* * * * *